(12) United States Patent
Guercio

(10) Patent No.: US 10,170,960 B2
(45) Date of Patent: Jan. 1, 2019

(54) ENERGY HARVESTING SYSTEM

(71) Applicant: Gianfranco Guercio, Vineyard, NJ (US)

(72) Inventor: Gianfranco Guercio, Vineyard, NJ (US)

( * ) Notice: Subject to any disclaimer, the term of this patent is extended or adjusted under 35 U.S.C. 154(b) by 0 days.

(21) Appl. No.: 15/356,532

(22) Filed: Nov. 18, 2016

(65) Prior Publication Data
US 2018/0142568 A1    May 24, 2018

(51) Int. Cl.
*F01D 15/10* (2006.01)
*H02K 7/18* (2006.01)
*F03D 1/04* (2006.01)

(52) U.S. Cl.
CPC .............. *H02K 7/183* (2013.01); *F03D 1/04* (2013.01); *F05B 2220/602* (2013.01); *F05B 2240/132* (2013.01)

(58) Field of Classification Search
CPC ............................. H02K 7/1823; F01D 15/10
See application file for complete search history.

(56) References Cited

U.S. PATENT DOCUMENTS

| | | | |
|---|---|---|---|
| 5,321,327 A * | 6/1994 | Jensen | G21D 7/02 310/10 |
| 5,336,933 A | 8/1994 | Ernster | |
| 7,973,262 B2 | 7/2011 | Matveev | |
| 8,875,509 B2 | 11/2014 | Glezer et al. | |
| 2010/0207389 A1 * | 8/2010 | Nyffenegger | F03B 13/00 290/44 |
| 2011/0266802 A1 * | 11/2011 | Rehman Alvi | F03D 1/04 290/52 |
| 2013/0219893 A1 * | 8/2013 | Davey | F01D 1/22 60/670 |
| 2013/0341930 A1 * | 12/2013 | Campagna | F03B 3/04 290/54 |
| 2016/0032904 A1 | 2/2016 | Kaplan et al. | |
| 2016/0177911 A1 * | 6/2016 | Kouris | F03B 3/02 290/52 |
| 2017/0145981 A1 * | 5/2017 | Culpepper | F03B 3/126 |

* cited by examiner

*Primary Examiner* — Sean Gugger

(57) ABSTRACT

An energy harvesting system for converting kinetic energy to electrical power includes an intake energy device, an impeller, and a motor. The intake energy device includes a housing and fins. The fins are positioned on an inner surface of the housing for receiving exhaust air. The received exhaust air moves the fins generating a vortex. The impeller is positioned at an inlet of a compressor and is in fluid communication with the intake energy device. The impeller is configured to receive the generated vortex, which rotates the impeller. The motor is rotatably connected to the impeller. The motor is electrically connected to a regulating circuit for converting kinetic energy of the exhaust air to electrical power.

4 Claims, 6 Drawing Sheets

ENERGY HARVESTING SYSTEM

TECHNICAL FIELD OF THE INVENTION

The invention disclosed herein generally relates to energy harvesting systems. More particularly, the invention relates to an energy harvesting system for effectively harvesting kinetic energy from exhaust air and converting the kinetic energy to electricity.

BACKGROUND

Electrical power is a necessary requirement for development of industrial and urban areas. Moreover, for functioning of most home appliances, power is an inevitable requirement. Power is generated from a variety of sources, for example, water, coal, wind, sun, etc. Over the years, with depletion of non-renewable resources and global warming concerns, there is a need for a system that maximizes efficiency of existing power generation plants. Typically, most power generation and manufacturing plants generate exhaust air at the end of a cycle or process. Conventionally, very little has been done to harness the energy of exhaust air to maximize efficiency of the power generation or manufacturing plant. A system, which harnesses the energy of exhaust air of the power plant, is required.

Hence, there is a long felt but unresolved need for a system, which maximizes efficiency of existing power generation plants. Furthermore, there is a need for a system, which harnesses the energy of exhaust air of the power generation or manufacturing plant.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The energy harvesting system disclosed herein addresses the above-mentioned need for a system, which maximizes efficiency of existing power generation plants. Furthermore, the invention addresses a need for a system, which harnesses the energy of exhaust air of the power generation or manufacturing plant. The energy harvesting system for converting waste energy to electrical power, the energy harvesting system includes an intake energy device, an impeller, and a motor. The intake energy device includes a housing and fins. The fins are positioned on an inner surface of the housing for receiving waste air and generating a vortex. The impeller is positioned at an inlet of a compressor and in fluid communication with the intake energy device. The impeller is configured to receive the generated vortex, which rotates the impeller. The motor is rotatably connected to the impeller. The motor is electrically connected to a regulating circuit for converting waste energy of the waste air to electrical power.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
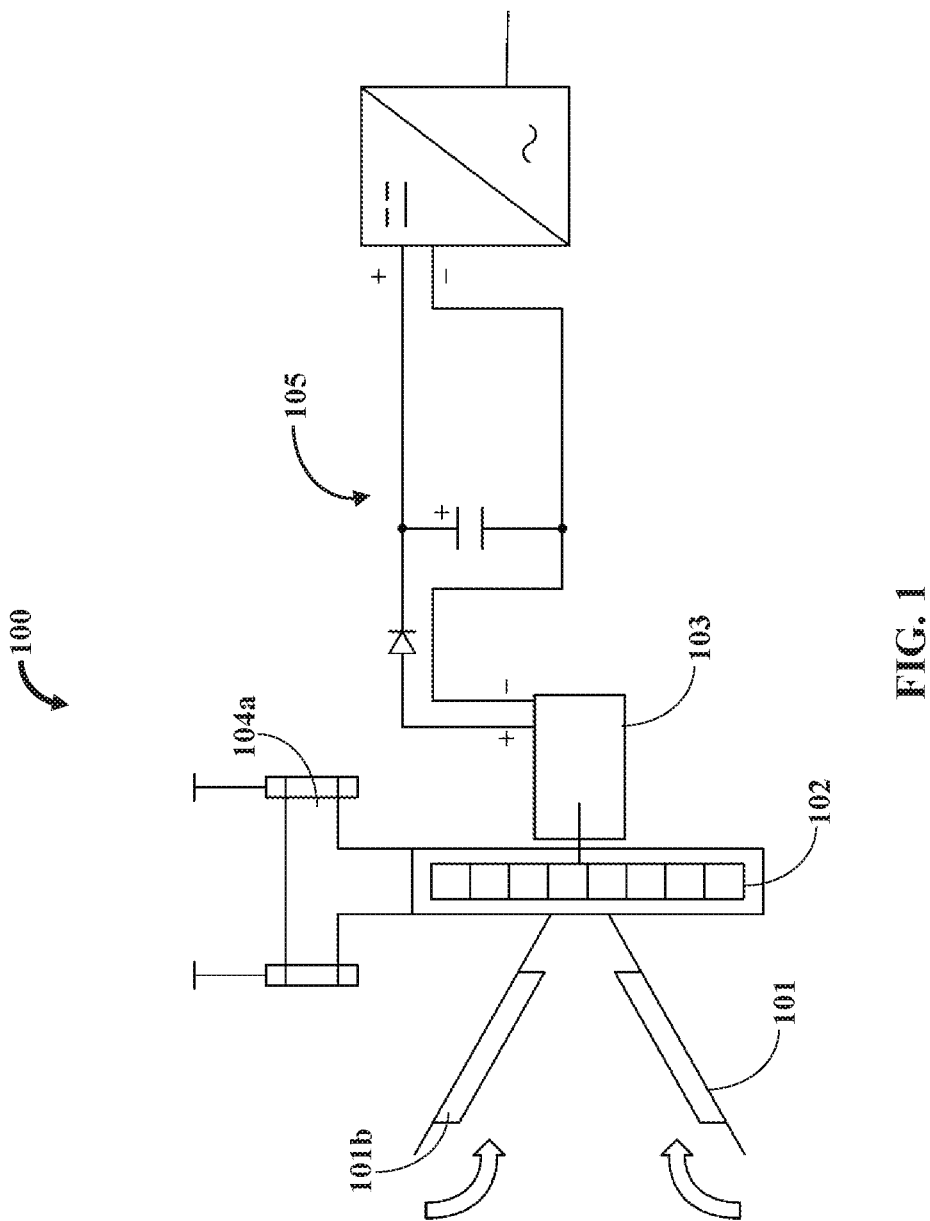
FIG. 1 exemplarily illustrates a schematic diagram of an energy harvesting system.
Figure 2:
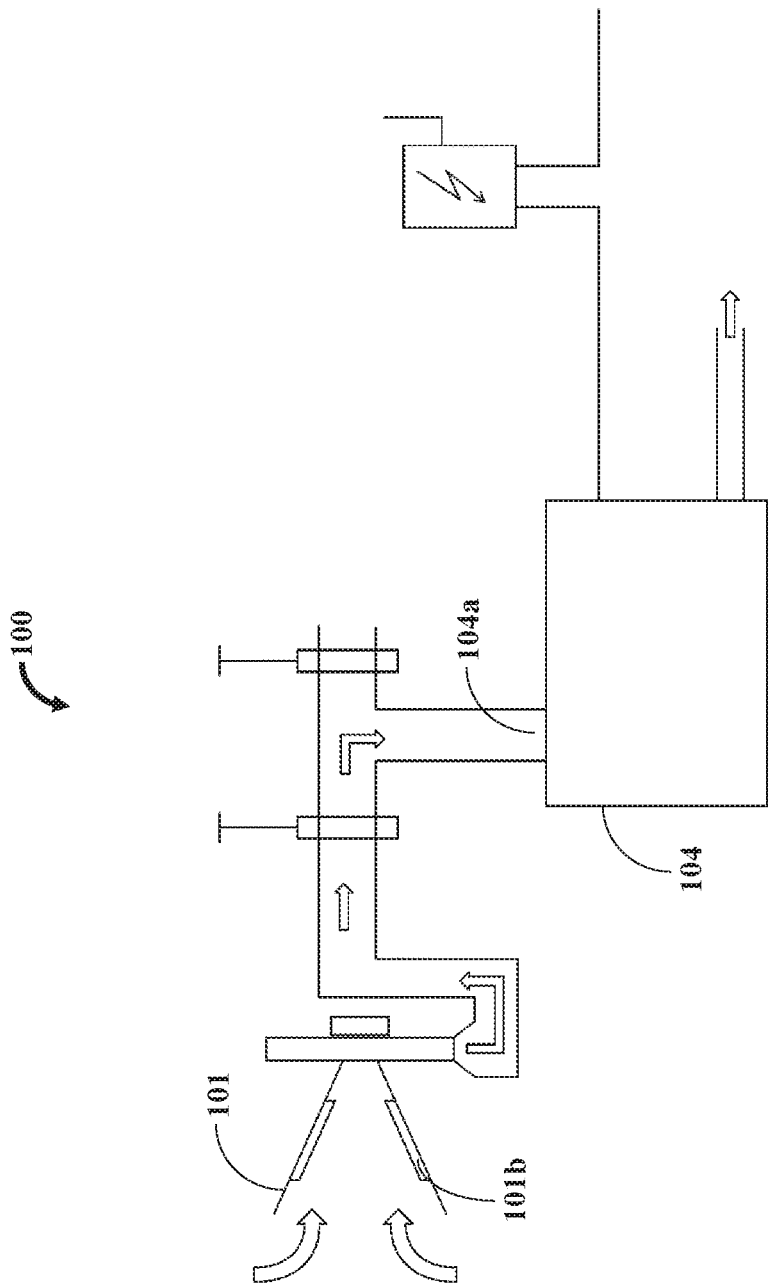
FIG. 2 exemplarily illustrates a schematic diagram of an energy harvesting system.

FIGS. 1-2 exemplarily illustrates a schematic diagram of an energy harvesting system 100. The energy harvesting system 100 for converting kinetic energy to electrical power includes an intake energy device 101, an impeller 102, and a motor 103. The impeller 102 is positioned proximal to an inlet 104a of a compressor 104. Additionally, the impeller 102 is in fluid communication with the intake energy device 101 and configured to receive the generated vortex. The generated vortex rotates the impeller 102. The motor 103 is rotatably connected to the impeller 102. The motor 103 is electrically connected to a regulating circuit 105 for converting kinetic energy of the exhaust air to electrical power. In an embodiment, the motor 103 is, for example, a direct current motor, a servomotor, etc.

The energy harvesting system 100 provides electrical power feed back into an electrical network using any existing system of compressed air or vacuum air for industrial applications. The wasted energy from the flow of air going through the intake is harnessed. The harnesses energy is converted into electricity and returned to the electrical system. The energy harvesting system 100 is similar to a small generation plant that generates power from kinetic energy of exhaust air. Once the power is returned to the electrical network, the power is sold back to the power provider. The energy harvesting system 100 solves the problem of high electric bills and harnesses the wasted energy making a better efficient operation for the power plant that adopts the energy harvesting system 100. In addition, any type of manufacturing plant can adopt the energy harvesting system 100.

Figure 3A:
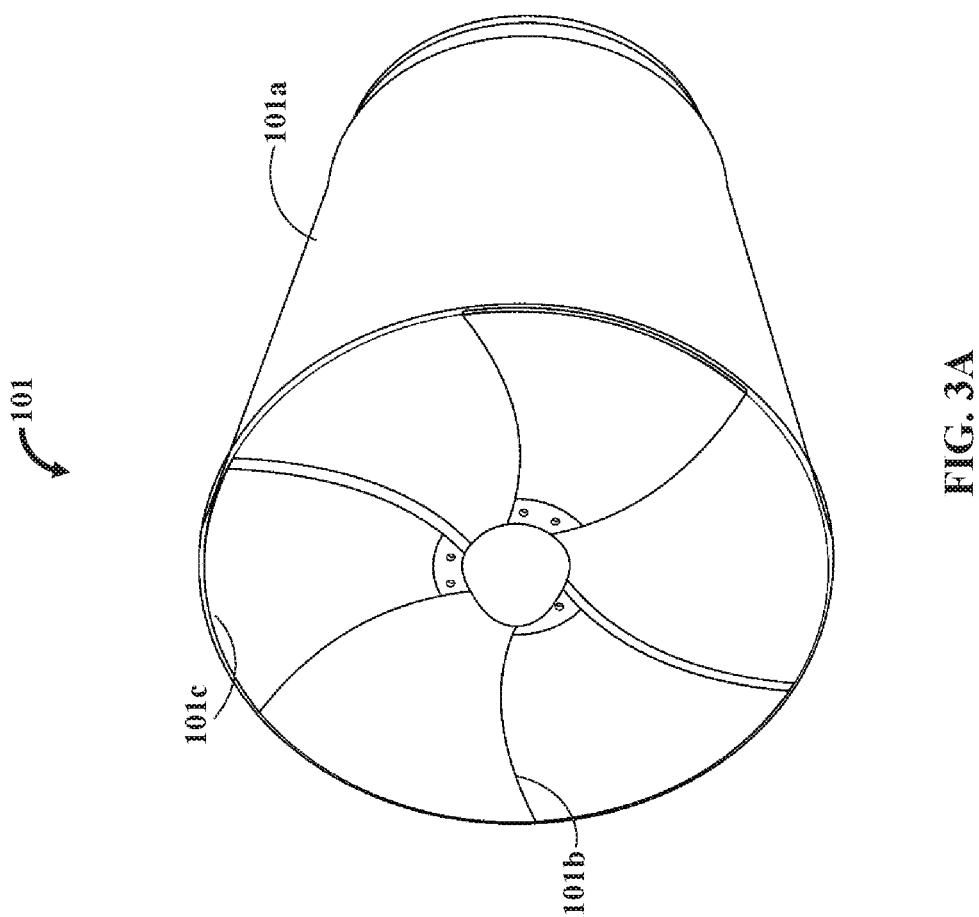
FIG. 3A exemplarily illustrates a perspective view of an intake energy device.

FIG. 3A exemplarily illustrates a perspective view of an intake energy device 101. The intake energy device 101 comprises a housing 101a and a plurality of fins 101b. In an embodiment, the housing 101a of the intake energy device 101 is of a conical configuration. In an embodiment, the fins 101b are positioned on an inner surface 101c of the housing 101a for receiving exhaust air and generating a vortex.

Figure 3B:
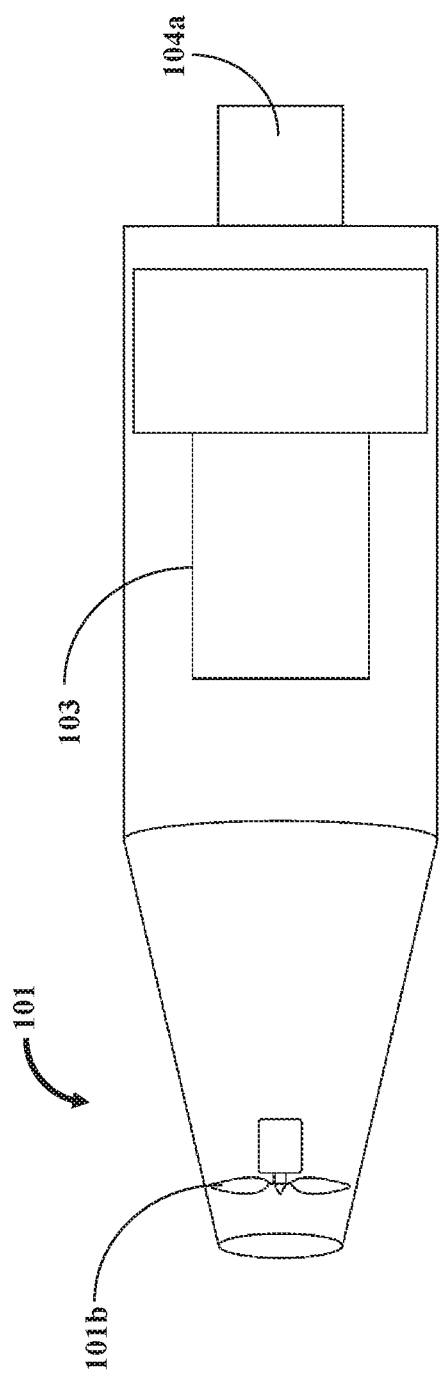
FIG. 3B exemplarily illustrates a perspective view of an intake energy device.

FIG. 3B exemplarily illustrates a perspective view of an intake energy device 101. The fins 101b of the intake energy device 101 receive the exhaust air and rotate to generate a vortex. The generated vortex rotates the impeller 102 as exemplarily illustrated in FIG. 1. The motor 103 is rotatably connected to the impeller 102. The motor 103 is electrically connected to a regulating circuit 105 for converting kinetic energy of the exhaust air to electrical power as exemplarily illustrated in FIG. 1. In an embodiment, the used exhaust air is sent to the inlet 104a of the compressor 104 exemplarily illustrated in FIG. 2.

Figure 4:
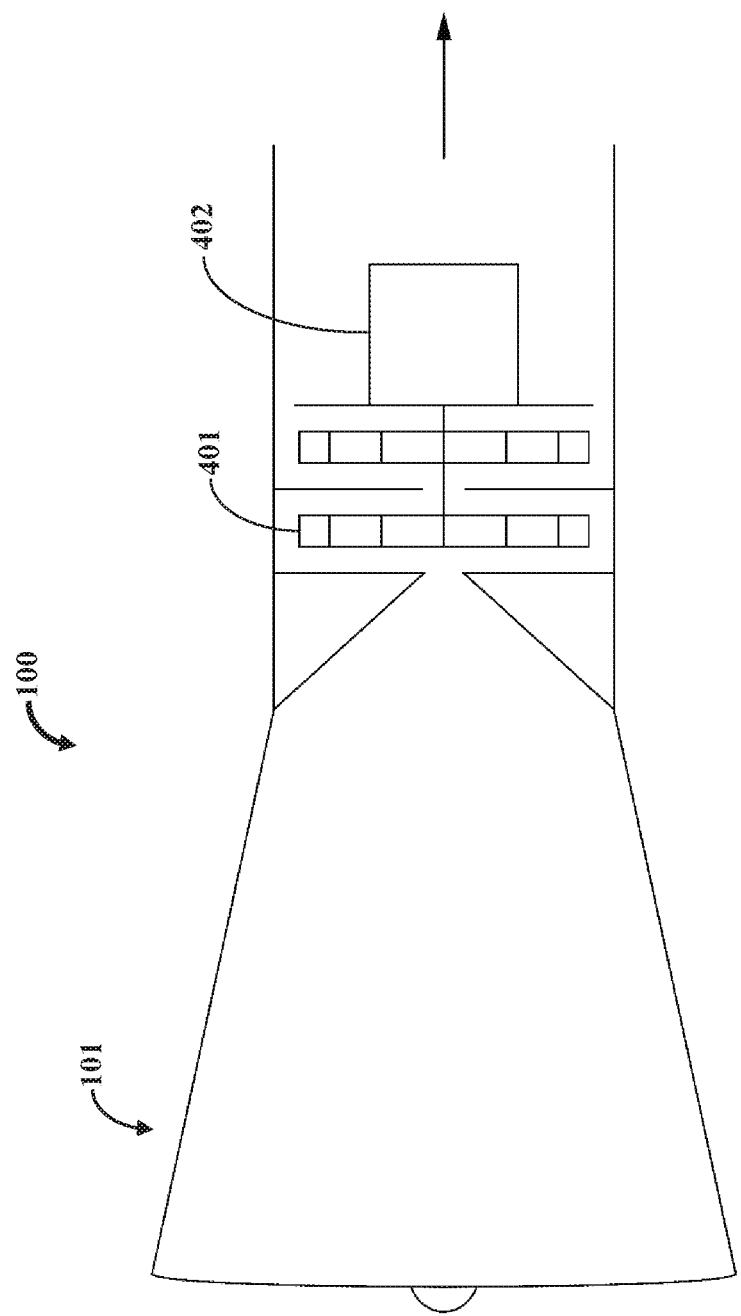
FIG. 4 exemplarily illustrates a schematic diagram of an energy harvesting system.

FIG. 4 exemplarily illustrates a schematic diagram of an energy harvesting system 100. The energy harvesting system 100 comprises the intake energy device 100, the mechanical means 401, and the electrical means 402 to generate electrical power from exhaust air. The fins 101b of the intake energy device 101 housed in the conical housing 101a as exemplarily illustrated in FIG. 3 accelerates the received exhaust air further into an accelerated air vortex. The mechanical means 401 harnesses the energy of the accelerated air vortex and the electrical means 402 converts the mechanical energy into the desired electrical power. The generated electrical power may be distributed to consumers via a distribution network.

Figure 5:
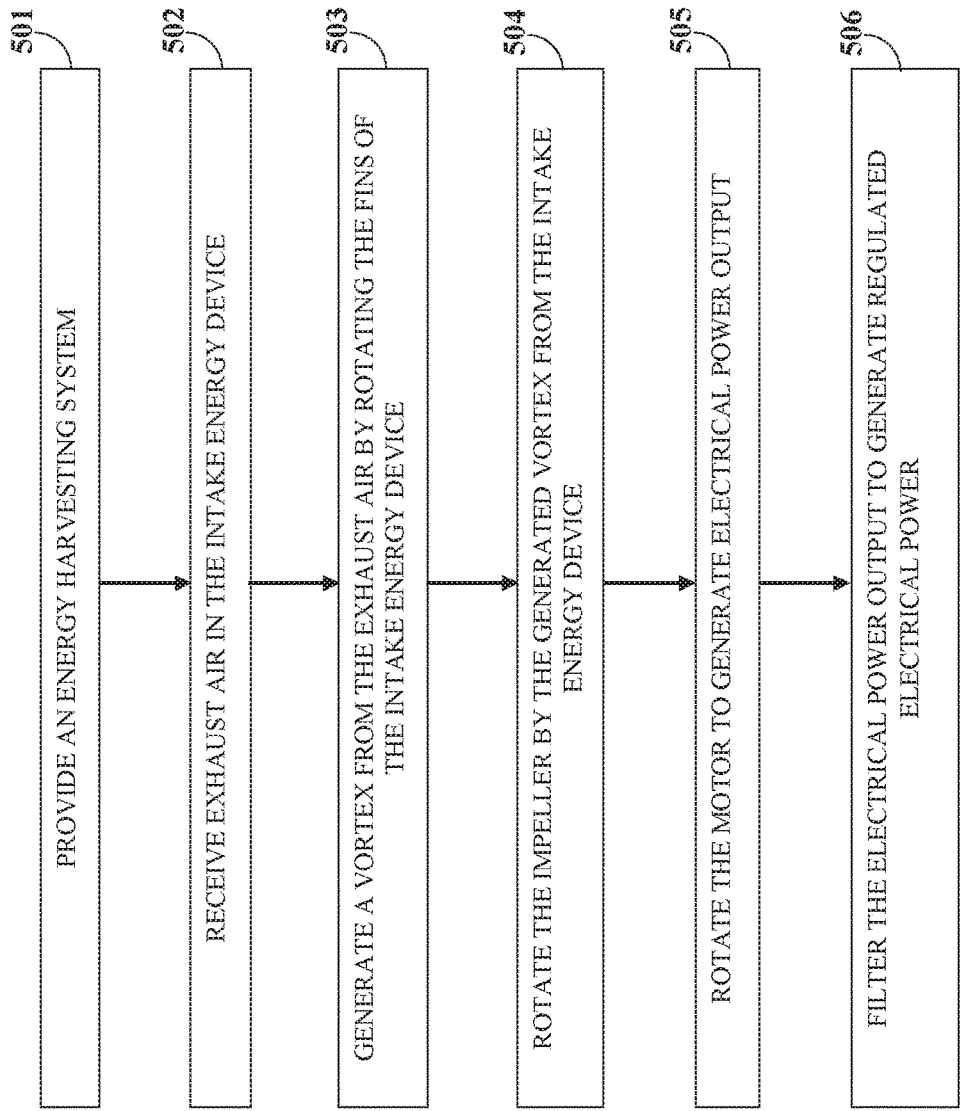
FIG. 5 exemplarily illustrates a method for converting kinetic energy to electrical power.

FIG. 5 exemplarily illustrates a method for converting kinetic energy to electrical power. In the method disclosed herein, an energy harvesting system 100 comprising an intake energy device 101, an impeller 102, and a motor 103, is provided 501. The exhaust air is received 502 in the intake energy device 101. A vortex is generated 503 from the exhaust air by rotating the fins 101b of the intake energy device 101. The impeller 102 is rotated 504 by the generated vortex from the intake energy device 101. The motor 103 is rotated 505 to generate electrical power output. The electrical power output is filtered 506 by a regulating circuit to generate regulated electrical power.

The foregoing examples have been provided merely for the purpose of explanation and are in no way to be construed as limiting of the energy harvesting system 100, disclosed herein. While the energy harvesting system 100 has been described with reference to various embodiments, it is understood that the words, which have been used herein, are words of description and illustration, rather than words of limitation. Further, although the energy harvesting system 100, has been described herein with reference to particular means, materials, and embodiments, the energy harvesting system 100 is not intended to be limited to the particulars disclosed herein; rather, the energy harvesting system 100 extends to all functionally equivalent structures, methods and uses, such as are within the scope of the appended claims. Those skilled in the art, having the benefit of the teachings of this specification, may effect numerous modifications thereto and changes may be made without departing from the scope and spirit of the energy harvesting system 100 disclosed herein in their aspects.

What is claimed is:

1. An energy harvesting system for converting kinetic energy to electrical power, the energy harvesting system comprising:

a) an intake energy device comprising a housing and a plurality of fins, wherein the fins are positioned on an inner surface of the housing for receiving exhaust air and generating a vortex;

b) an impeller positioned proximal to an inlet of a compressor and in fluid communication with the intake energy device, the impeller configured to receive the generated vortex, the impeller has an impeller rotational axis and directs the exhaust air to flow radially outwardly from an axis defined by the impeller rotational axis of the impeller, wherein the generated vortex rotates the impeller; and c) a generator rotatably connected to the impeller, wherein the generator is electrically connected to a regulating circuit;

wherein the inlet to the compressor is mounted radially relative to the impeller to receive the exhaust air from the impeller.

2. The energy harvesting system of claim 1, wherein the housing of the intake energy device is of a conical configuration.

3. A method for converting kinetic energy of exhaust air to electrical power, the method comprising:

a) providing an energy harvesting system comprising:
   i) an intake energy device comprising a housing and a plurality of fins;
   ii) an impeller positioned proximal to an inlet of a compressor and in fluid communication with the intake energy device, the impeller has an impeller rotational axis and directs the exhaust air to flow radially outwardly from an axis defined by the impeller rotational axis of the impeller; and
   iii) a generator rotatably connected to the impeller;

b) receiving exhaust air in the intake energy device;

c) generating a vortex from the exhaust air from the fins of the intake energy device;

d) rotating the impeller by the generated vortex from the intake energy device;

e) rotating the generator to generate a regulated electrical power output; and f) filtering the regulated electrical power output to generate regulated electrical power;

wherein the inlet to the compressor is mounted radially relative to the impeller to receive the exhaust air from the impeller.

4. The method of claim 3, wherein the housing of the intake energy device is of a conical configuration.

\* \* \* \* \*